United States Patent [19]

Morita et al.

[11] 4,042,866

[45] Aug. 16, 1977

[54] METHOD OF PREPARING NC TAPES

[75] Inventors: Eiichi Morita; Hisayuki Sato; Toru Kobayashi, all of Ikeda, Japan

[73] Assignee: Daihatsu Motor Company, Limited, Osaka, Japan

[21] Appl. No.: 614,228

[22] Filed: Sept. 17, 1975

[30] Foreign Application Priority Data

Sept. 20, 1974 Japan .............................. 49-108955
Sept. 20, 1974 Japan .............................. 49-108956
Feb. 13, 1975 Japan .................................. 50-18597

[51] Int. Cl.² ............................................ G05B 19/42
[52] U.S. Cl. .................................................... 318/568
[58] Field of Search ................................. 235/151.11; 318/568–569; 234/2, 62, 79

[56] References Cited

U.S. PATENT DOCUMENTS

| 3,072,833 | 1/1963 | Kerr et al. ............................ 318/568 |
| 3,366,934 | 1/1968 | Kelsey ............................ 318/568 X |
| 3,624,371 | 11/1971 | Neal et al. ........................ 235/151.11 |
| 3,629,558 | 12/1971 | Coggin ............................. 318/568 X |

Primary Examiner—Jerry Smith
Attorney, Agent, or Firm—Hall & Houghton

[57] ABSTRACT

A method for preparing NC (numerical control) tapes for use with numerical control machine tools wherein the information required for preparing the NC tapes is divided into three types of information, one type being machine item information, one being tool item information, and the third being drawing information, with the three types being fed into an information processing unit, the first type information being taped, the second type information being either taped or carded, both types of information being adapted for use by the operator so that such information can be selected when needed from a storage area for use and reuse in the information processing unit, the third type of information being adapted for feeding directly into the information processing unit by reason of a movable index operation of an input table and push button operation of function keys mounted on keyboard, by an operator's manual operation thereof based on his discretion.

3 Claims, 4 Drawing Figures

METHOD OF PREPARING NC TAPES

BACKGROUND OF THE INVENTION a. Field of the Invention

The present invention relates to a method of preparing NC (numerical control) tapes for NC machine tools.

b. Description of the Prior Art

NC machine tools (NC machines) are highly efficient and have spread in the industry as a hope for labor saving.

In operating an NC machine, however, an NC tape is required by which the operating commands are put in.

The preparation of NC tapes not only needs expert knowledge and a special language but also takes much time.

In the case of production of articles in small quantities, the total man-hour required for preparation of an NC tape can be greater than that required for machining of articles, often causing an increase in cost or a decrease in the rate of operation of the NC machine.

In general, the NC machine consists of a machine tool proper and a control unit for controlling the same, and, in many cases, different manufacturers produce different types of such machine tools and control units and employ different data input systems for the latter. Accordingly, various formats for NC tapes are now in use.

As a result, running two or three or more NC machines of different manufacturers will entail very cumbersome preparation of NC tapes.

The method of preparing NC tapes can be classified into manual programming and automatic programming.

Manual programming is the process of planning a sequence of machining steps from a design drawing, designing a jig, and preparing a process sheet. This operation is done by a programmer. In the phase of planning machining steps, selection of an NC machine and locations on work to be machined is effected. In the phase of preparing a process sheet, the contents of machining, machining sequence, tools to be used and conditions for machining are determined and coordinate calculations in the direction of depth are made. The values thus found are thus converted into coordinates for use in the NC machine, and the path and move of the tool are entered in the process sheet using the NC machine format. A key puncher punches a tape to record the contents of the process sheet thus prepared, thereby preparing an NC tape.

Manual programming is liable to cause errors, since the symbols and coordinate values in the direction of depth differ with each NC machine. Also, since the method of giving coordinate commands differs with each NC machine, errors wil occur. Moreover, since the format differs with each NC machine, misentry often occurs, and so does mispunching.

In brief, manual programming necessitates manually carrying out complicated calculations and other program-making operations, thus requiring much time and labor, so that it is inefficient and does not necessarily provide a highly reliable program.

Automatic programming is the process of planning a sequence of machining steps from a design drawing, designing a jig, and preparing a process sheet and a part program. This operation is done by a programmer. The machining step planning and jig designing are the same as in manual programming. In the phase of preparing a process sheet, the contents of machining, machining sequence, tools to be used, conditions for machining and locations on work to be machined are defined and the path and move of the tool are described in the part program in a unique language.

A key puncher punches a card to record the contents of each part program thus prepared, thereby providing a punched card. The punched card is put into a large computer through a card reader, and an NC tape is automatically prepared through a tape preparing unit connected to said computer.

In automatic programming, the NC language is so difficult as to require an excellent programmer. Further, part programming is difficult. And, a large computer has to be used.

In brief, automatic programming requires an excellent programmer and since it seeks to solve the problems associated with various processes and operations by aid of software, it requires medium- and large-sized computers, which are more expensive then the NC machine.

SUMMARY OF THE INVENTION

The present invention is intended to eliminate the drawbacks described above and is designed to prepare an NC tape which is fit for any particular NC machine so as to enable the necessary machine items, drawing information and tool information to be put into said NC machine in a manner common to any NC machines while minimizing the amount of information and simplifying the operation (to allow even the machinist to prepare such NC tape).

The present invention is characterized in that in view of the fact that there are methods of coordinate command, tape formats, spindle rpm values, feed speeds and other machine items which are peculiar to individual NC machines, punched tapes (hereinafter referred to as post-processors) relating to said machine items are prepared one for each NC machine and are repeatedly used.

The invention is further characterized in that the kind, shape, size, diameter and length of each tool, the machining cycle peculiar to each tool, the standard machining conditions (cutting speed, feed speed, depth of cut, etc.) of each tool with respect to the material of work, and other tool items are recorded by punching a card or tape to prepare a tool card or tool tape for each tool and that such tool card or tool tapes are repeatedly used.

It is further characterized in that a design drawing is pinned to an input table, which is provided with a movable index. The design information is put in by using a key board having a number of keys.

With the steps of machining planned and a process sheet prepared from said design drawing, the selection of an NC machine and the determination of machining sequence, contents of machining and a tool to be used are made.

A post-processor tape corresponding to the NC machine thus selected is picked out and put into an information processing unit (mini-computer). The movable index is then set at the origin of the coordinate system on the design drawing pinned to the input table, and in this condition a definition of the origin of the coordinate system is put into the information processing unit by means of the function keys on the key board. The key board and the information processing unit are electrically connected together so that keying can be recorded in the information processing unit. As for the definition of the origin, e.g., with P = XOO, YOO and XOO, it is directly formulated by pushing the corresponding keys on the key board in the order mentioned. Not that the coordinates of each machining location are so determined in advance, but that the operator puts the dimensions noted in the design drawing directly into the information processing unit by means of the keys on the key board while setting the movable index at the successive machining locations in the order of machining while looking at the design drawing.

The above operation refers to figure definition.

This figure definition is formulated by setting the index at the successive machining locations in the order of machining, and putting the actual coordinates of each location with respect to the orgnii into the information processing unit through the key board (this is achieved by reading the dimensions entered in the design drawing). In this case, it is so arranged that setting the index results in indexing one of the addresses in the memory of the information processing unit. When the coordinate value is put in by the corresponding keys on the key board at the location where the index has been set, this information is stored in the indexed address as new coordinate value information, whereupon the old information is erased from said address.

In this way, the figure definition is carried out with respect to each machining location in the machining sequence. Upon completion of the figure definition, the information on the tool to be used at each machining location is put into the information processing unit through the tool card (or tool tape). In this case, the tool cards (or tool tapes) will be inserted into the card reader (or tape reader) in the machining sequence. Each time such tool card is inserted, the index is set at the corresponding machining location on the design drawing so as to index the corresponding address in the memory and store the tool item information together with the coordinate information in said address. At this stage, information on the depth of cut is also put in each time by the key board. Such depth of cut is read directly from the design drawing.

After the tool item information with respect to all machining locations has been put into the information processing unit, the preparation of an NC tape is automatically carried out.

In addition, it is so arranged that all input information is automatically typed on a data sheet by an electric typewriter, so that if erroneous information is put in, this can be detected. Further, in such occasion, an error indicating lamp is lighted.

In brief, the information processing unit carries out coordinate position calculation and conversion thereof using the input information and translate the same to provide symbols and a format matching with the associated NC machine and arrange or coordinate them, thereby automatically preparing an NC tape with which to carry out the intended machining.

A concrete example of the present invention will now be described with reference to the accompanying drawings.

DESCRIPTION OF THE PREFERRED EMBODIMENT

Figure 1:
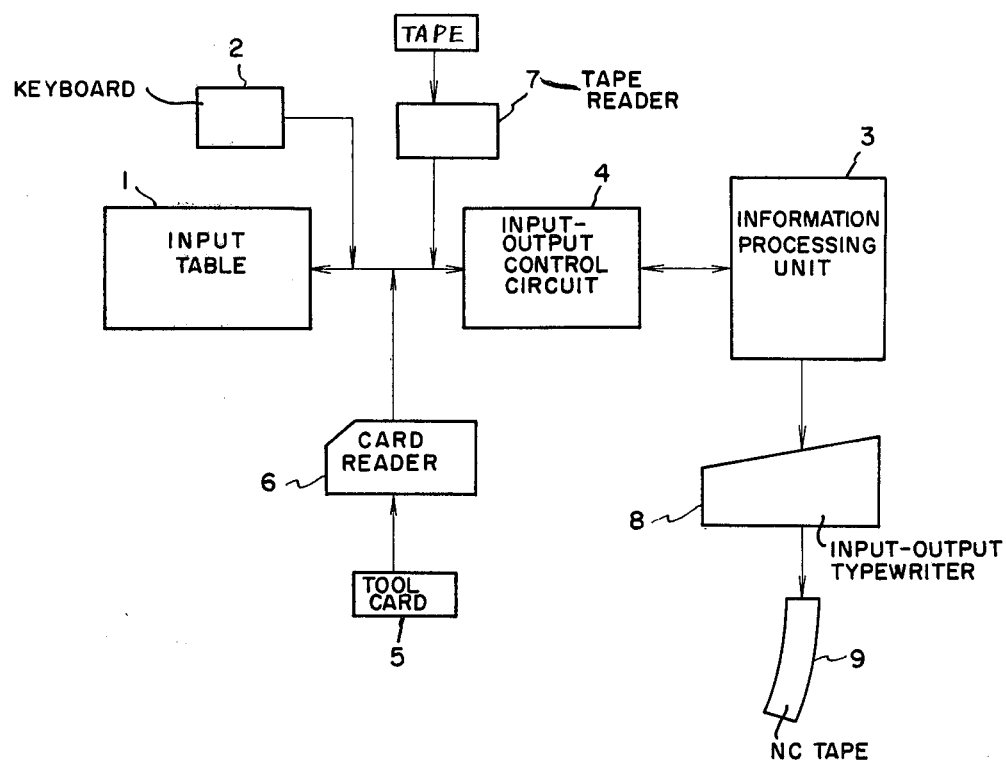
FIG. 1 is a block diagram of an apparatus for embodying the method of the present invention.

FIG. 1 is a block diagram of an apparatus for embodying the present invention, in which 1 designates an input table and 2, a key board, these serving to put data on machining location, depth of cut, machining sequence, etc. obtained from a design drawing directly into an input-output control circuit 4 in an information processing unit 3. Designated at 5 is a tool card and 6 is a card reader, which serves to put tool information into the input-output control circuit 4 of the information processing unit 3. A tape reader 7 serves to put a main processor and post-processor into the input-output control circuit of the information processing unit 3. Designated at 8 is an input-output typewriter, whereby an NC tape 9 is prepared from the information processed by the information processing unit 3.

The information processing unit 3 includes, besides the input-output control means 4, means for storing information and means for processing information by calculation.

Figure 2A:
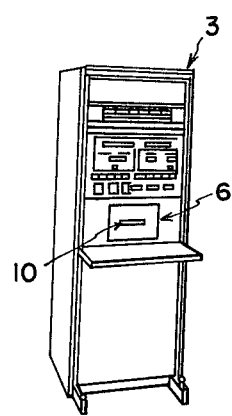
FIGS. 2a-2c are a schematic view of the apparatus.
Figure 2B:
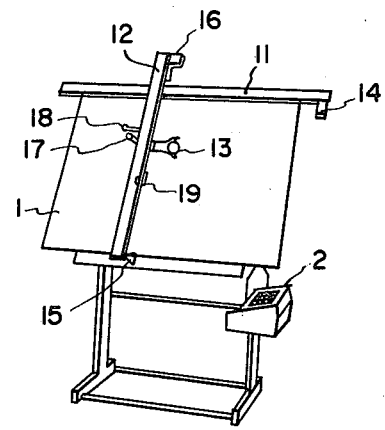
Figure 2C:
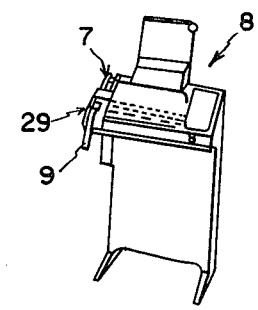

FIG. 2 is a schematic view of an apparatus for embodying the present invention. The card reader 6 is built into the information processing unit 3 and provided with a card insertion port 10 in the front surface thereof. The key board 2 is attached to the side of the input table 1. The tape reader 7 is built into the side of the input-output typewriter 8.

The input table 1, which will have a design drawing pinned thereto, is provided with an index 13 which is two-dimensionally movable by aid of an X-rail 11 and a Y-rail 12. The X-rail 11 is attached to the upper end of the input table 1 and has a cursor movable along said X-rail. The cursor is joined to a portion of an endless tape entrained around steel pulleys installed at both ends of the X-rail 11, and one of said pulleys has an X-position detector 14 connected to the rotary shaft thereof.

The Y-rail 12 is connected to the X-cursor and has a tail roller 15 attached to the lower end thereof, said roller being in contact with the lower edge of the input table 1 to enable the Y-rail to move smoothly in the X-direction.

The Y-rail 12 has a cursor movable therealong, said cursor being connected to a portion of an endless steel tape entrained around pulleys installed on both sides of the Y-rail 12, one of said pulleys having a Y-position detector connected to the rotary shaft thereof.

The index 13 is connected at its base to the Y-cursor and has an operating handle 17. The index 13 comprises transparent glass or lens fitted in a circular frame and marked with a cross, circle or rectangle in fine line.

The Y-rail 12 contains a balancer to balance the Y-cursor so that the latter will slide lightly. Y-rail 12 has a Y-brake lever 18 and X-brake lever 19 attached thereto whereby the index 13 can be fixed at any desired position when necessary.

The two position detectors 14 and 16 are pulse oscillators adapted to emit one pulse per a distance of 0.1 mm traveled by the index 13 with the rotation of the pulleys so divided, and in the illustrated embodiment, commercially available optical shaft encoders are employed.

Figure 3:
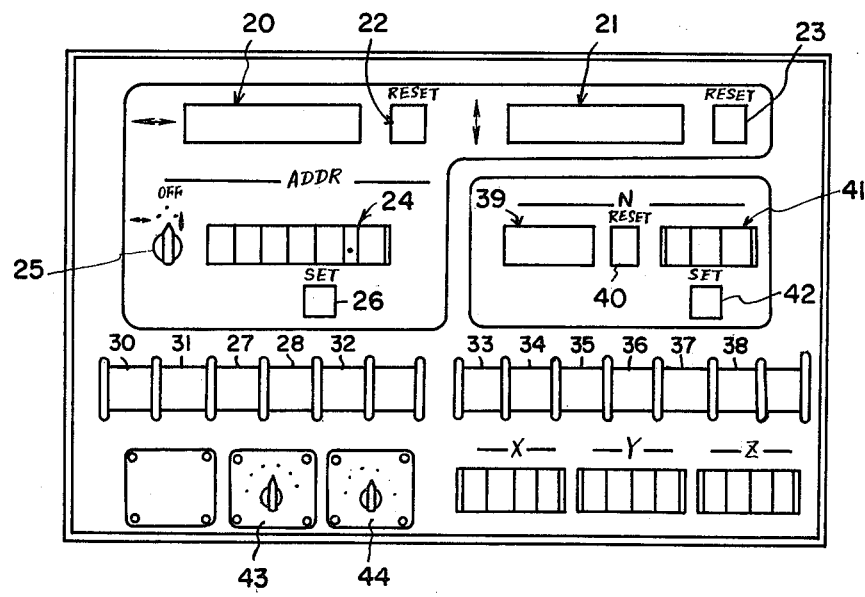
FIG. 3 is a front view of the operating panel of an information processing unit.

These two position detectors 14 and 16 are connected to registers contained in the information processing unit 3 and are adapted to digitally indicate the current position on an X-indicator and a Y indicator installed on an operating panel disposed on the front surface of the information processing unit 3. Thus, the operating panel on the front surface of the information processing unit 3, as shown in FIG. 3, has an X-indicator 20 and a Y-indicator 21 and also has reset buttons 22 and 23 disposed laterally of said indicators. By pressing the reset buttons 22 and 23, it is possible to make the indicated values on the indicators zero irrespective of the position on the input table 1 assumed by the index 13. When the indicated values on the two indicators 20 and 21 are made zero by the reset buttons 22 and 23, the position of the index 13 on the table 1 becomes the origin of the X-Y rectangular coordinate system, so that the move of the index 13 will thereafter be digitally indicated as X-Y coordinate values as measured from said origin, and its plus or minus sign also indicated.

The operating panel has a dial type adder 24 for setting the indicated values on the two indicators 20 and 21. A changeover switch 25 is disposed laterally of said adder and a reset button 26 is provided therebelow. When it is desired to add a given value to the indicated value on the X-indicator 20, this can be achieved by manually rotating the dial of the dial type adder 24 to present said given value, changing the changeover switch 25 to the X-side and pressing the set button 26, whereupon said given value is added to the indicated value on the X-indicator. The same applies to the Y-direction.

The input table 1 is constructed to select a memory element circuit within the information processing unit 3. In other words, the information processing unit is provided with a memory comprising a number of closely arranged memory element circuits, so that placing the index 13 at any position on the input table 1 will result in selection of a memory element circuit corresponding to said position.

Figure 4:
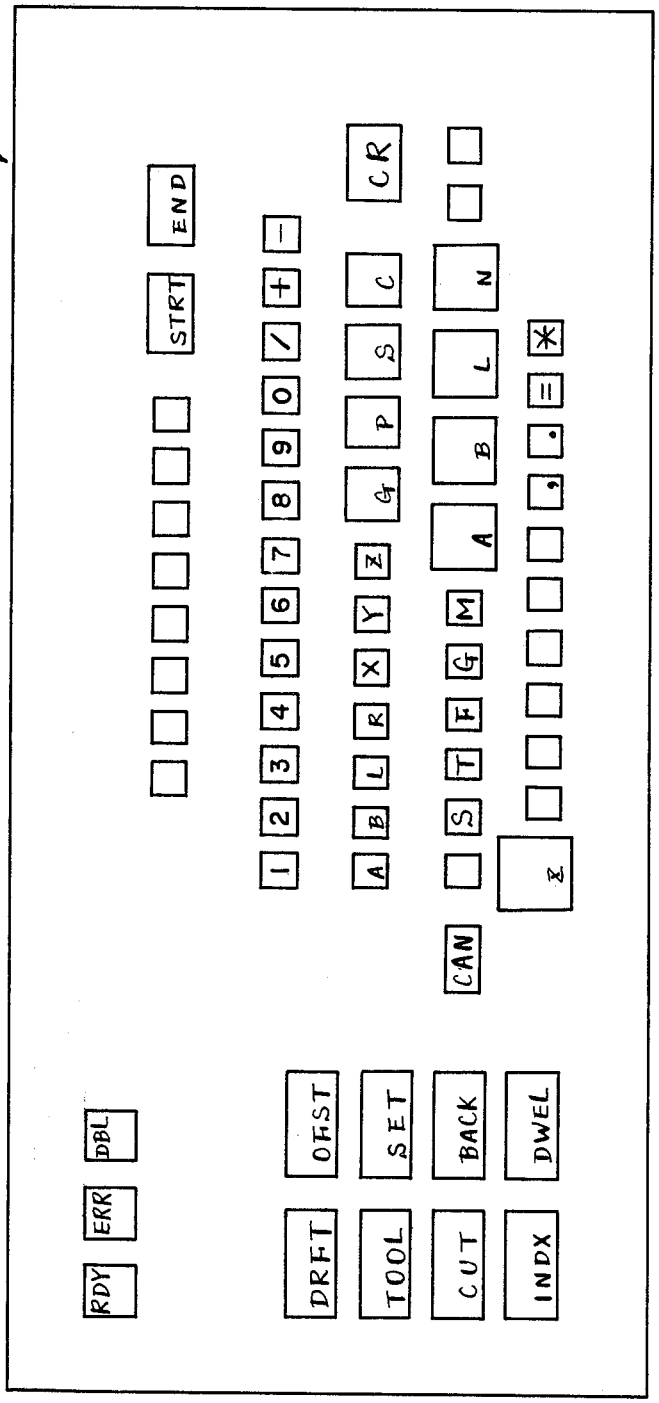
FIG. 4 is a front view of a key board.

The key board 2 serves to put the drawing information entered in the design drawing into the information processing unit 3 and giving operating commands to the various operating elements in the information processing unit 3 and to this end it has a number of function keys necessary for putting the drawing information and various operating commands into the information processing unit. (See FIG. 4.)

The function keys comprise keys on which words are written according to the class of the operation to allow the machinist to operate them without the need for special knowledge, numeral keys, four-fundamental-arithmetic-operation sign keys, XYZ coordinate keys, etc., these keys being arranged according to the class of the operation.

Stated plainly, each of the keys on the key board 2 constitutes a switch in the operating command circuit. Therefore, the command for operation of the arithmetically processing circuit and the command for storing operation of the memory in the information processing unit 3 can be carried out by pressing the associated keys on the key board 2.

The input-output typewriter 8 has the capability of typing on a data sheet the information put in by the board 2 and all the processing data translated into action by the information processing unit 3. When all the information necessary for preparing an NC tape has been put into the information processing unit 3, an end signal is emitted by the key board 2, whereupon all the information is arranged and coordinated to cause the tape punching machine disposed laterally of the input-output typewriter to punch the NC tape.

The information given by the key board 2 and the information given by the tool card are translated into the machine language by the main processor and post processor.

Each tool card is prepared by beforehand punching a card of definite size to record such tool information as the kind and length of a tool, the operating cycle peculiar to said tool and the standard cutting conditions of said tool.

Each tool card is prepared by beforehand coding the kind and length of a tool, the operating cycle peculiar to said tool and the standard cutting conditions of said tool, and then punching a card to record them. In this connection, the operator will have to judge what tool is necessary on the basis of the machining indications entered in the drawing, and then select the tool card corresponding to that tool.

As for the main processor, only one such processor is prepared by punching a tape to record the tape format used to translate the information necessary for preparation of the NC tape into the common machine language. As for the post processor, it is prepared for each NC machine by punching a tape to record the machine items and the tape format concerning the method of giving commands peculiar to each NC machine. The term "machine items" refers to the rpm of the main spindle and its steps of NC machine and also refers to whether the machine origin is of the fixed type (absolute) or of the float type (incremental). Since the actual situation is that any NC machine uses a command language different from the machine language translated by the main processor, there is the need for a tape format concerning the translation of the command language peculiar to each machine. This accounts for the need for the preparation of a post processor for each machine, as described above.

The present invention is arranged in the manner described above and a description of the auxiliary arrangement will be given in the course of the operation to be described below.

The preparation of a tape according to the invention is carried out in the following sequence.

First of all, the main processor is set into the tape reader 7 disposed laterally of the input-output typewriter 8 and the read command switch associated therewith is turned on. As a result, the information of the main processor is read by the tape reader 7 and stored in the main processor information memory of the information processing unit 3.

Upon completion of reading of the main processor information, the main processor is removed from the tape reader 7 and the post processor is then set into the tape reader 7 and the read command switch is turned on. As a result, the post processor information is read and stored in the post processor information memory of the information processing unit 3.

The next step is the figure definition. The figure definition is started by pressing the figure definition button 28 disposed on the front surface of the information processing unit 3 and then pressing the start and CR keys on the key board 2.

When the figure definition button is pressed, the main processor information is prepared within the information processing unit 3. The pressing of the start and CR keys causes the input circuit for figure information to be connected to the translation circuit for the main processor. Further, the input-output typewriter 8 is made ready for typing.

The index 13 on the input table 1 is then placed at the origin on the design drawing, and in this condition the reset buttons 22 and 23 are pressed to make the indicated values on the indicators 20 and 21 zero, whereby the memory circuit in the information processing unit 3 memorizes the coordinate origin thus calibrated.

Drawing information on one of the machining locations on the drawing is put into the information processing unit 3 by the key board 2 on the basis of the corresponding dimensions entered in the drawing. As a result, the information processing unit 3 causes the input-output typewriter 8 to type the drawing information on a data sheet just as it is, while within the information processing unit 3 the drawing information is put into the calculation circuit to calculate the coordinates, the results being then translated into coordinate information by the translation circuit, the translated information being temporarily stored in a temporary memory. In this condition, the index 13 on the input table 1 is brought onto a machining point on the design drawing and the positioning and CR keys are pressed, whereby one of the memory element circuits which corresponds to the machining location on the design drawing pinned to the input table 1 is selected, and the X-Y coordinates indicated by the index 13 are used as address information, which, together with the translated information temporarily stored in the temporary memory, is stored in said memory element circuit. Such translated information and the address information are typed on the data sheet by the input-output typewriter 8.

The figure definition described above is formulated with respect to each machining location on the design drawing.

In brief, the figure definition is formulated by putting the necessary drawing information into the information processing unit in advance and positioning the index at the successive machining locations.

The names and functions of the keys on the key board 2 and the types of the input-output typewriter 8 are listed below.

| NAME OF KEY | FUNCTION | YTPE |
|---|---|---|
| Positioning (DRFT) | Reading coordinate values of drafter. | DRFT |
| Tool change (TOOL) | Indicating tool change. Concurrently, reading tool card. | TOOL |
| Cutting (CUT) | Indicating cutting operation | CUT |
| Index (INDX) | Indicating rpm of index table. | INDEX |
| Offset (OFST) | Indicating the amount of offset along with X, Y or Z. | OFST |
| Set (SET) | Indicating set position of tool. Set position is one read by positioning key. Movement of tool takes place in the order X, Y, Z. | SET |
| Back (BACK) | Indicating retracted position of tool. Retracted position is one read by positioning key as in the case of Set. Movement of tool takes place in the order Z, X, Y. | BACK |
| Dwell (DWEL) | Indicating dwell action of tool. If necessary, also indicating dwell time. | DWEL |
| End (END) | indicating end of processing program. | END |
| Star (STRT) | Indicating start of processing program. | |
| Can | Indicating cancellation of keyed data. After this key is pressed, re-keying is effected starting with the first letter. | |
| CR | Indicating completion of keying of data. | |
| Upper (A) | Selecting point at upper position, in connection with selection of one out of two points at the time of figure definition. | A |
| Lower (B) | Selecting point at lower position, in connection with selection of one out of two points. | A |
| Left (L) | Selecting point at left, in connection with selection of one out of two points. | L |
| Right (R) | Selecting point at right, in connection with selection of one out of two points. | R |
| X | Indicating X coordinate value at the time of figure definition and tape preparation. | X |
| Y | Indicating Y coordinate value. | Y |
| Z | Indicating Z coordinate value. | Z |
| Group of points (G) | Indicating that type of figure is group of points, at the time of figure definition. | G |
| Point (P) | Indicating that type of figure is point. | P |
| Straight line (S) | Indicating that type of figure is straight line. | S |
| Circle (C) | Indicating that type of figure is circle. | C |
| Angle (A) | Designating angle of figure. | A |
| Central angle (B) | Designating central angle of arcuate figure | B |
| Length (L) | Designating length and radius of figure. | L |
| Number (N) | Designating the number of points at the time of figure definition. | N |
| S | Performing S designation at the time of preparation of tape. | S |
| T | Performing T designation. | T |
| F | performing F designation. | F |
| G | Performing G designation. | G |
| M | Performing M designation. | M |
| Depth (Z) | Designating depth of cut at the time of cutting. | Z |
| = | Indicating sign at the time of figure definition. | = |
| . | Indicating decimal point. | . |
| + | Indicating positive sign or addition. | + |
| − | Indicating negative sign or subtraction | − |
| • | Indicating multiplication. | • |
| / | Indicating division. | / |

Indicating lamps disposed at upper left of the key board 2 indicate the following.

RDY: When it is lighting green, it indicates that inputting by keying is possible.

ERR: When an error in inputting or programming occurs, this lamp lights red.

DBL: When two or more keys are simultaneously pressed, this lamp lights red, indicating such miskeying.

The errors described above will be typed on the data sheet by the input-output typewriter 8 by using the following numbers.

In the case of figure definition:

| NO. | MEANING |
|---|---|
| 01 | Parameter double-defined. |
| 02 | Format error. |
| 03 | Suffix error. |
| 04 | Absence of = in numerical formula. |
| 05 | Parameter pattern error. |
| 10 | Use of undefined figure. |
| 11 | Use of lattice-like group of points as parameter. |
| 12 | Base points of lattice-like groups of points are not equal. |
| 20 | Intersection between two straight lines cannot be found. |
| 21 | Intersection between straight line and circle cannot be found. |
| 22 | Intersection between two circles cannot be found. |
| 23 | Z values in figure differ. |
| 24 | Drafter value is given to other than point or |

-continued

| NO. | MEANING |
|---|---|
| | group of points. |

In the case of preparation of tape.

| NO. | MEANING |
|---|---|
| 51 | Command, double-defined |
| 52 | Format error |
| 54 | Error of numerical data. |
| 61 | Error of tool card. |
| 71 | Use of undefined figure. |

Figure definition is carried out by using the keys on the key board as described above.

Figure information can be defined (or geometrically defined) as a point, line, circle, and a point or group of points on a line or arc.

A method of figure definition will now be described. The letters and their meanings used in the definition are as follows.

X: X coordinate (X component)
Y: Y coordinate (Y component)
Z: Z coordinate (Z component)
$P_i$: Name of point ($i=1$–99)
$S_i$: Name of line ($i=1$–50)
$C_i$: Name of circle ($i=1$–50)
$G_i$: Name of group of points ($i=1$–10)
$L_{nn}$: Distance (length), or radius
$A_{nn}$: Angle with respect to X axis
$B_{nn}$: Central angle of arc
$N_{nn}$: Number ($nn=1$–99)
$\alpha$: Auxiliary designation (or designation when distinguishing between two points)
R — Of two points, the one having higher X value.
L — Of two points, the one having lower X value.
A — Of two points, the one having higher Y value.
B — Of two points, the one having lower Y value.

The values which the suffixes and numerical values can take are as follows.

Suffixes (i, j, k)
0-99
Numerical values (nn, mm, 11, n'n')
The units and resticted values vary according to the object to be expressed.
Coordinate values (X, Y, Z)
Unit *mm*
Range — 9999. 999–9999. 999.
Distance, radius (L)
Unit *mm*
Range 0–9999. 999.
Angle (A, B)
Unit mm
Range A: −360° 00′–360° 00′ B: 0–360° 00′
Number (N)
Unit piece (integer)
Range 0–99

Numerical designation permits the use of numerical formulas and the operators usable are the following four, the order of preference of operators being determined by the order of inputting.
+ addition
− substraction
* multiplication
/ division

1. definition of point.
 1. Absolute address designation.

The distance from the origin (0, 0, 0) is indicated by X, Y, Z components.
Example; $P_{01} = X_{10}, Y_{20}, Z_{30}$.
 2. Relative position designation
$P_i = P_j, X_{nn}, Y_{mm}, Z_{ll}$
This indicates a point whose X, Y, Z components are displaced by nn, mm, ll, respectively, from point $P_j$.
 3. Re-definition.
$P_i = P_j$
$P_i$ is used as the name of the coordinates of point $P_j$.
In this case, the name $P_j$ is deleted.
 4. Intersection between two straight lines.
$P_i = S_i, S_j$
 5. Distance from point on straight line.
$P_i = S_i, P_j, L_{nn}, \alpha$
This indicates a point at a distance nn from a point $P_j$ on a straight line $S_i$. In this case, $\alpha$ is used to show on which side of the straight line $S_i$ the point $P_i$ is disposed with respect to the point $P_j$.
 6. Intersection between straight line and circle.
$P_i = S_i, C_i, \alpha$
 7. Intersection between two circles.
$P_i = C_i, C_j, \alpha$
 8. Tangent drawn from a given point to a circle.
$P_i = P_j, C_i, \alpha$
 9. Perpendicular (or intersection).
$P_i = S_i, P_j$
 10. Point on arc (or circle).

$$P_i = \begin{Bmatrix} C_i \\ P_i, L_{nn} \end{Bmatrix}, A_{mm}$$

This indicates a point at which a radius forming an angle of mm° with the X axis intersects an arc (or circle).

2. Definition of straight line.
 1. Straight line passing through two points.
$S_i = P_i, P_j$
 2. Straight line determined by a point and an angle which it forms with the X axis.
$S_i = P_i, A_{nn}$
 3. Parallel lines.
$S_i = S_j, L_{nn}, \alpha$
Combination of a straight line $S_j$ and a distance $L_{nn}$ indicates a parallel line located on one or the other side of the line $S_j$.
 4. Parallel lines.
$S_i = S_j, P_i$
This indicates a straight line which passes through a point $P_i$ and which is parallel to a straight line $S_j$.

3. Definition of circle.
 1. Center and radius.
$C_i = P_i, L_{nn}$

4. Definition of group of points.
 1. Group of points on straight line.

$$G_i = P_i \begin{Bmatrix} S_1 \\ A_{11} \end{Bmatrix}, N_{nn}, L_{mm}$$

This indicates a group of points such that a group of nn points are equispaced on a straight line (or straight line $S_1$) passing through a point $S_i$ and inclined at an angle 11°. In this case, $P_i$ is included in the group of points.

2. Group of points like the above.

$G_i = C_i, A_{mm}, N_{ll}$

This indicates a group of points such that a group of 11 points are equispaced on a circumference, starting with a point which makes an angle mm° with the X axis on a circle $C_i$.

3. Group of points on arc.

$G_i = C_i, A_{mm}, B_{ll}, N_{n'n'}$

This indicates a group of points such that a group of n'n' points are equispaced on an arc whose central angle is 11°, starting with a point on a circle $C_i$ forming an angle mm° with the X axis.

4. Lattice-like group of points.

$G_i = G_j, G_k$

This indicates a group of points located on intersections of groups of parallel lines passing through groups of points on straight lines. In this case, the origins $G_j, G_k$ must be equally defined.

The figure definition is formulated by the method described above. Thus, the function keys on the key board 2 are defined one by one as a point, line, circle and group of points, the CR key being pressed at the end of each definition.

The information processing unit 3 is caused to find the coordinates of the intended machining location and the index 13 on the input table is placed at said location, the coordinates thereof being memorized in the memory element circuit corresponding to said location.

When the coordinates of the individual machining locations have been memorized in the manner described above, the figure definition ends.

In order to transmit this termination to the information processing unit, the End key and CR key are pressed. As a result, the input-output typewriter 8 types the letters meaning the main-processor termination on the data sheet.

At the end of the figure definition, the tape preparation button on the operating panel of the information processing unit 3 are pressed and then the End key and CR key are pressed. Thereby, the card reader and information processing unit are connected together. In this condition, the tool cards are successively inserted into the card reader in the order of machining. If, for example, one machining location $P_{01}$ on the design drawing is drilling of a 30 mm dia. hole, then a drill card for 30 mm dia. drilling is inserted into the card reader, so that the latter reads the tool information of the tool card. When the card reader has read the tool information, it kicks out the card. The index 13 on the input table is then placed on $F_{01}$ on the design drawing, and in this condition the positioning, set, and CR keys on the key board are pressed. As a result, the tool information on the machining location $P_{01}$ together with the coordinate information is put in order, and in this condition, the depth-of-cut, numeral and CR keys on the key board 2 are pressed, whereby the depth of cut concerning said $P_{01}$ is given and the information processing unit 3 memorizes it.

As for the next machining location, first of all, the tool change and CR keys on the key board 2 are pressed and then the tool card is inserted into the reader. The index 13 on the input table 1 is placed on said location and the positioning, set and CR keys on the key board are pressed.

In the same manner, tool information is inputted for the other machining locations.

In addition, when two or more different machining operations are to be performed, for example, when drilling is followed by tapping, the machining information on the drilling is inputted and without moving the index 13 on the input table 1, the tap card is inserted into the card reader. The tool change and CR keys on the key board 2 are pressed and then the positioning, set and CR keys on the key board 2 are pressed.

Upon completion of inputting of machining information on all the machining locations, the End and CR keys on the key board 2 are pressed, whereupon the input-output typewriter 8 automatically types out the intended NC tape from the punching machine 29.

In addition, an example of data which is typed out by the input-output typewriter 8 on a data sheet is as follows.

---

SET PROCESS MODE & KEY IN START CODE
MAIN PROCESSOR START DRAFTER ADDRESS $xP_1$ = X0Y130Z150
$P_{01}$ = X0000000Y0013000Z0015000←00005 ↑ 01300
$x S_1$ = P1A90
$x S_2$ = S1L30L
$x C_1$ = P1L85
$x P_2$ = C1S2A
$P_{02}$ = X−0003000Y0020953Z0015000←00298 ↑ 02097
$x P_4$ = X−20−40−60Y50+20Z100
$x G_1$ = P4A0L240N5
$G_{01}$ = X−0012000Y0007000Z0010000←01770 ↑ 00701
END MAIN PROCESSOR
SET PROCESS MODE & KEY IN START CODE
x (TOOL)
x TBDO04L190. 000D080. 00
x SW10400W21000W30250 FW10030W20080W30020

| 01 N001 | F500 T |
| N002 | M06 |
| x (DRFT) (SET) | |
| N003 X 030500 | F500 |
| N004 | Y010500 |
| N005 | Z019000 |
| x (CUT)Z22 | |
| N006 | S22M03 |
| N007 | Z016600F008 |
| N008 | Z019000F150 |
| N044 | Z020000F150 |
| (END) | |
| NO45G00X 030500 | F500M05 |
| NO46 | M30 |
| POST END | |

---

In the above data sheet, the opening letters "SET PROCESS MODE & KEY IN START CODE⇌" are typed out by pressing the figure definition button.

The letters "MAIN PROCESSOR START DRAFTER ADDRESS" are typed out by pressing the START and CR keys on the key board.

The letters "* P1=X0130Z150" are typed out exactly in accordance with what has been typed by the key board.

The letters "P01=X0Y130Z150" are typed out by placing the index 13 of the input table 1 at P1 on the design drawing and pressing the START and CR keys on the key board.

That is, the letters preceded by the mark * are exactly what has been typed by the key board. The letters "END MAIN PROCESSOR" mean the termination of figure definition and are typed out when the END and CR keys on the key board are pressed.

Further, the letters "SET PROCESS MODE & KEY IN" which come second and the letters "POST START" which follow are typed out by pressing the tape preparation button.

The letters "* (TOOL)" are typed out by pressing the tool change and CR keys and the letters which follow are the results of typing of what has been inputted from the tool card, and those which follow "POST START"

and which are not marked with * are typed out on the NC tape successively in order from the top downward.

In addition, in FIG. 3, the numeral 30 designates a power source button; 31, a reset button; 32, a code change button; 33, 34, 35 and 36, lamps for indicating the kind of a tool designated by a tool card; 37, a dwell indicating lamp; 38, a spindle key lock indicating lamp; 39, a sequence number indicator for NC tape preparation; 40, a reset button therefor; 41, a sequence number setting dial; 42, a set button therefor; 43, a smallest command unit selecting switch; and 44 designates a work material selecting switch.

As has been described so far, according to the present invention, an NC tape can be prepared without requiring the conventional complicated figure calculation and part program preparation. Moreover, errors can be decreased and there is no need for knowledge of a special language such as computer language in connection with the preparation of an NC tape, thus allowing even the machinist to operate the apparatus. Thus, NC tapes of this kind can be prepared easily, quickly and at low cost. Further, since NC tapes can be prepared in a short time and easily and at low cost, production of many kinds of articles in small quantities can be carried out by an NC machine. A further merit is that even in a factory using several NC machines of different manufacturers, NC tapes can be prepared in the same manner.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. A method of preparing a NC tape for use in a NC machine tool operation, said method comprising obtaining particular machine item information, transferring such machine item information to tape means, transferring the machine item information from the tape means to an information processing unit, obtaining particular tool item information, transferring such tool item information to tape means or card means, transferring the tool item information from tape means or card means to an information processing unit, providing a particular design drawing containing machining and processing coordinates thereon, transferring the particular information on said design drawing directly to an information processing unit, processing the three types of information in the information processing unit, transferring the processed information to typewriter means and actuating said typewriter means to produce an NC tape therefrom.

2. A method in accordance with claim 1, wherein the design drawing is fixed to a support, manually detecting machining location on said design drawing, inputting the coordinate of said location into the information processing unit exactly in accordance with what is designated on the design drawing, and repeating the operation for all machining locations.

3. A method in accordance with claim 1, wherein the tool information is punched on cards or tapes, said information being for the kind, shape, length, diameter, feed space, machining cycle and machining restrictions of particular tools.

* * * * *